United States Patent
Benoit et al.

(10) Patent No.: US 9,062,890 B2
(45) Date of Patent: Jun. 23, 2015

(54) ENERGY RECOVERY VENTILATOR

(75) Inventors: Jeffrey T. Benoit, Willington, CT (US); Gregory M. Dobbs, South Glastonbury, CT (US); Norberto O. Lemcoff, Simsbury, CT (US)

(73) Assignee: CARRIER CORPORATION, Farmington, CT (US)

( * ) Notice: Subject to any disclaimer, the term of this patent is extended or adjusted under 35 U.S.C. 154(b) by 1037 days.

(21) Appl. No.: 13/002,866

(22) PCT Filed: Jul. 1, 2009

(86) PCT No.: PCT/US2009/049347
§ 371 (c)(1),
(2), (4) Date: Jan. 6, 2011

(87) PCT Pub. No.: WO2010/002957
PCT Pub. Date: Jan. 7, 2010

(65) Prior Publication Data
US 2011/0146941 A1    Jun. 23, 2011

Related U.S. Application Data

(60) Provisional application No. 61/077,401, filed on Jul. 1, 2008, provisional application No. 61/077,451, filed on Jul. 1, 2008, provisional application No. 61/077,421, filed on Jul. 1, 2008.

(51) Int. Cl.
*F24F 12/00* (2006.01)
*F28D 9/00* (2006.01)

(52) U.S. Cl.
CPC .......... *F24F 12/006* (2013.01); *F24F 2012/007* (2013.01); *F28D 9/0062* (2013.01); *Y02B 30/563* (2013.01)

(58) Field of Classification Search
CPC ..... F28D 20/02; F28D 20/021; F28D 20/025; F28D 20/028; F28D 21/00; F28D 19/04
USPC .......... 165/7, 148, 6, 9.3, 9.4, 10, 11.1, 11.2, 165/200, 201, 222, 223, 224, 225, 230, 236, 165/275, 276, 166, 54; 62/271
See application file for complete search history.

(56) References Cited

U.S. PATENT DOCUMENTS 3,590,914 A * 7/1971 Duncan .................. 165/166
5,033,537 A * 7/1991 Atkin et al. ............. 165/282

(Continued)

FOREIGN PATENT DOCUMENTS

GB        2116305 A  *  9/1983
JP     2004219053 A     8/2004

(Continued)

OTHER PUBLICATIONS

PCT International Search Report and Written Opinion of the International Searching Authority for International Application No. PCT/US2009/049347, Jan. 29, 2010, 11 pages.

*Primary Examiner* — Mohammad M Ali
*Assistant Examiner* — Raheena Rehman
(74) *Attorney, Agent, or Firm* — Cantor Colburn LLP

(57) ABSTRACT

An energy recovery heat exchanger (100) includes a housing (102). The housing has a first flowpath (144) from a first inlet (104) to a first outlet (106). The housing has a second flowpath (146) from a second inlet (108) to a second outlet (110). Either of two cores may be in an operative position in the housing. Each core has a number of first passageways having open first and second ends and closed first and second sides. Each core has a number of second such passageways interspersed with the first passageways. The ends of the second passageways are aligned with the sides of the first passageways and vice versa. A number of heat transfer member sections separate adjacent ones of the first and second passageways. An actuator is coupled to the carrier to shift the cores between first and second conditions. In the first condition, the first core (20) is in the operative position and the second core (220) is not. In the second condition, the second core is in the operative position and the first core is not. When a core is in the operative position, its first passageways are along the first flowpath and the second passageways are along the second flowpath.

8 Claims, 12 Drawing Sheets

(56) References Cited

U.S. PATENT DOCUMENTS

| | | | |
|---|---|---|---|
| 5,184,600 A * | 2/1993 | Astle, Jr. | 126/113 |
| 5,497,823 A * | 3/1996 | Davis | 165/231 |
| 7,152,670 B2 * | 12/2006 | Dobbs et al. | 165/166 |
| 8,267,164 B2 * | 9/2012 | Lestage et al. | 165/200 |
| 2004/0194490 A1 | 10/2004 | Lee et al. | |

FOREIGN PATENT DOCUMENTS

| | | |
|---|---|---|
| JP | 2005331193 A | 12/2005 |
| WO | WO 9703324 A1 * | 1/1997 |

* cited by examiner

ENERGY RECOVERY VENTILATOR

U.S. GOVERNMENT RIGHTS

The invention was made with U.S. Government support under contract DE-FC26-01NT41254 awarded by the Department of Energy, National Energy Technology Laboratory. The U.S. Government has certain rights in the invention.

FIELD OF THE INVENTION

The disclosure relates to heat exchangers. More particularly, the disclosure relates to energy recovery ventilator heat exchangers.

BACKGROUND

Flat plate crossflow, flat plate counterflow, and cylindrical air-to-air heat exchangers are used to recover thermal energy from ventilation air that has been conditioned. Generally they operate on the outside air and are "preconditioners" upstream of heating and/or cooling coils that are used for thermal conditioning of the building supply air. When the plates are made of a material that is impervious to moisture they are generally referred to as heat recovery ventilators (HRV) that recover sensible energy. When the plates are made of a material that can transmit moisture they recover latent energy as well and are then generally known as energy recovery ventilators (ERV).

A new class of ERV devices use thin polymer films for plates. The polymer is chosen for excellent moisture (latent heat) transmission under the influence of a difference in the absolute concentration of water vapor on the two sides of the plate. These devices have been dubbed enhanced energy recovery ventilator (EERV) or membrane energy recovery ventilator (MERV) devices. An exemplary device is found in U.S. Pat. No. 6,684,943.

Exemplary devices use a stack of spaced-apart plates. With reference to exemplary square plates, between each two adjacent plates, a pair of closure bars is positioned along a pair of opposite edges to laterally enclose a channel between the plates. The pair of orientations may alternate to define two interspersed sets of channels: one set of the channels passing the heat/moisture donor air; and the other set of channels passing the heat/moisture receiving air.

SUMMARY

One aspect of the disclosure involves an energy recovery heat exchanger including a housing. The housing has a first flowpath from a first inlet to a first outlet. The housing has a second flowpath from a second inlet to a second outlet. Either of two cores may be in an operative position in the housing. Each core has a number of first passageways having open first and second ends and closed first and second sides. Each core has a number of second such passageways interspersed with the first passageways. The ends of the second passageways are aligned with the sides of the first passageways and vice versa. A number of heat transfer member sections separate adjacent ones of the first and second passageways. An actuator is coupled to the carrier to shift the cores between first and second conditions. In the first condition, the first core is in the operative position and the second core is not. In the second condition, the second core is in the operative position and the first core is not. When a core is in the operative position, its first passageways are along the first flowpath and its second passageways are along the second flowpath.

In various implementations, the cores may be in a common carrier. The actuator may be coupled to the cores via the carrier. The heat exchanger may have first and second remote bays aside the operative position for respectively receiving the first core and the second core when the other of the two is in the operative position. The operative position may thus be between the first and second bays.

When in the operative position, the first and second cores may have properties different from each other. The first and second cores may, further, be differently configured.

Another aspect of the disclosure involves an energy recovery heat exchanger including a housing. The housing has a first flowpath from a first inlet to a first outlet. The housing has a second flowpath from a second inlet to a second outlet. A core is in the housing. The core has a number of first passageways having open first and second ends and closed first and second sides. The core has a number of second such passageways interspersed with the first passageways. The ends of the second passageways are aligned with the sides of the first passageways and vice versa. A number of permeable membrane sections separate adjacent ones of the first and second passageways. A carrier carries the core within the housing. An actuator is coupled to the carrier to shift the carrier between first and second conditions (e.g., orientations). In the first condition, the first passageways are along the first flowpath and the second passageways are along the second flowpath. In the second condition, a local flow direction through at least one of the pluralities of passageways is reversed relative to the first condition.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
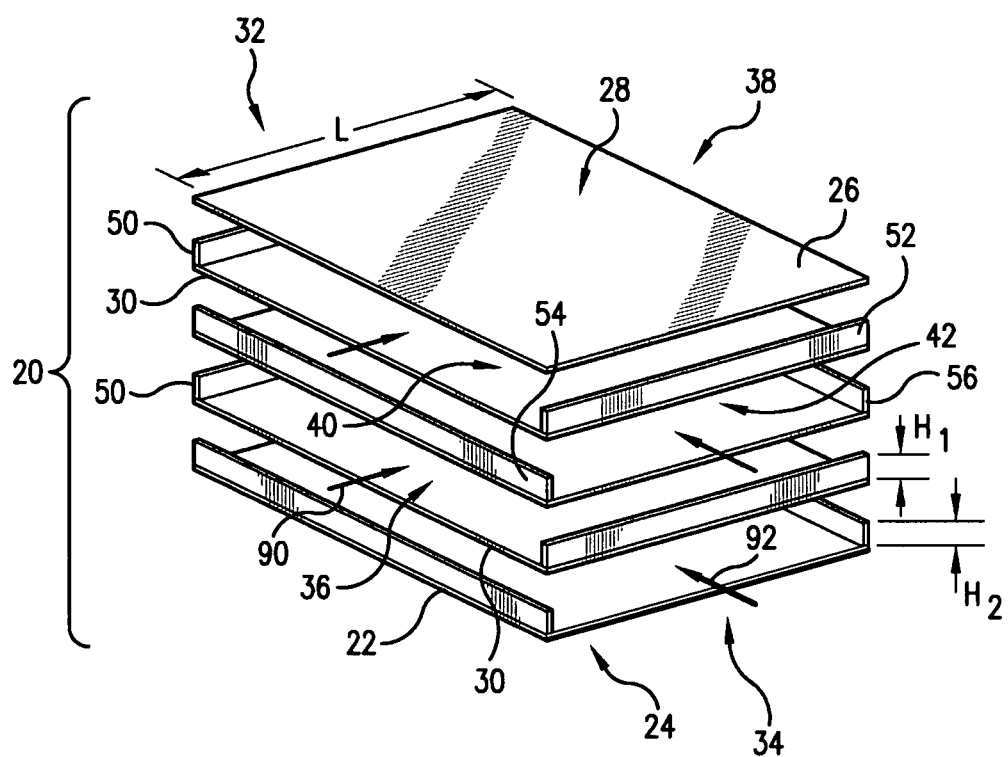
FIG. 1 is an exploded view of a heat exchanger core.

FIG. 1 shows a heat exchanger core 20 including an array of membrane sections. The exemplary membrane sections are arrayed from a first end section 22 at a first end 24 to a second end section 26 at a second end 28. Intermediate sections 30 are spaced between the end sections 22 and 26. Exemplary sections are separate pieces of rectangular (e.g., square) planform. The core 20 has a first pair of opposed sides 32 and 34 and a second pair of opposed sides 36 and 38. Each exemplary membrane section is spaced apart from its adjacent section or sections to define interspersed first and second passageways 40 and 42. The first passageways 40 have open ends respectively at the core sides 36 and 38 and closed ends (sides) respectively at the core sides 32 and 34. Conversely, the second passageways 42 have open ends along the sides 32 and 34 and closed ends (sides) along the sides 36 and 38.

The closed sides of the exemplary passageways are defined by associated closure pairs. Exemplary closures are closure/spacer bars that function both to close and to space the sections apart. A first pair of first and second closure bars 50 and 52 are along each first passageway 40 whereas a second pair of first and second closure bars 54 and 56 are along the second passageways 42.

In the exemplary square planform heat exchanger, the closure bars are all of essentially the same length L. FIG. 1, however, shows the closure bars as having respective heights $H_1$ and $H_2$. As is discussed further below, the present disclosure provides an asymmetry which may include differences between $H_1$ and $H_2$.

Figure 2:
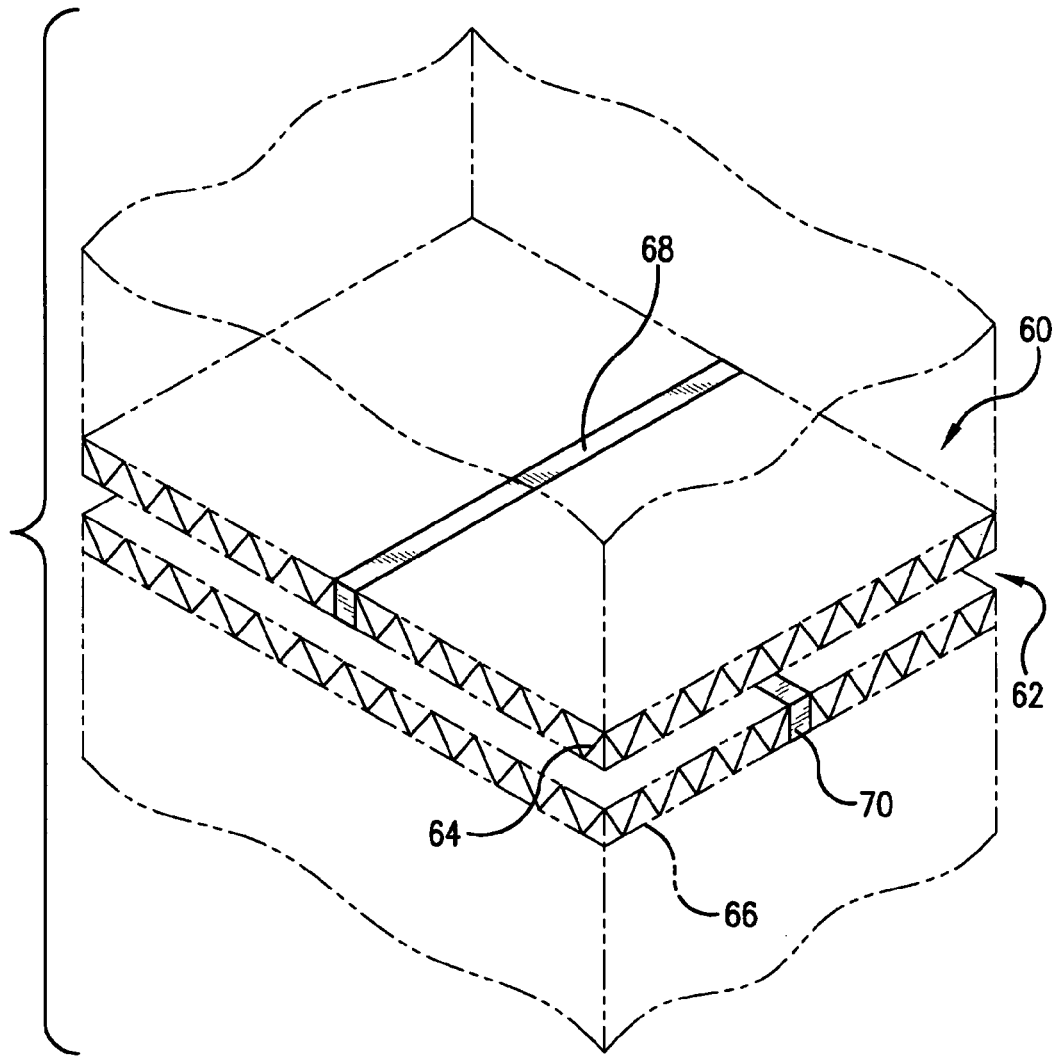
FIG. 2 is a view of spacers removed from the core of FIG. 1.

In the exemplary core 20, the closure bars 50, 52, 54, and 56 define/maintain membrane section spacing and associated passageway height at the associated edges of the membrane sections. As noted above, the membrane sections may be subject to pressure-induced displacement altering the spacing and passageway heights at intermediate locations. Accordingly, additional spacing means may be included to control membrane section spacing and passageway height, additional spacers may be included. Exemplary spacers 60 and 62 comprise molded pyramid lattices 64 and 66 (e.g., of an appropriate engineering plastic (FIG. 2)). The exemplary spacers each have a central strip 68 and 70 unitarily molded with the associated lattice. The exemplary strips 68 and 70 are substantially right parallelepipeds. The exemplary strips have a strip height which may be essentially the same as the associated height $H_1$ or $H_2$ of the closure bars of the associated passageway. Strip thickness may be much less than strip height. The strips may be oriented in the streamwise direction (e.g., between the open ends of the associated passageway). The exemplary lattice structures 64 and 66 may have a similar height to the associated strips 68 and 70.

The first passageways 40 define branches of a first flowpath 90 through the core 20 and its associated equipment. Similarly, the second passageway 42 form branches of a second flowpath 92.

Figure 3:
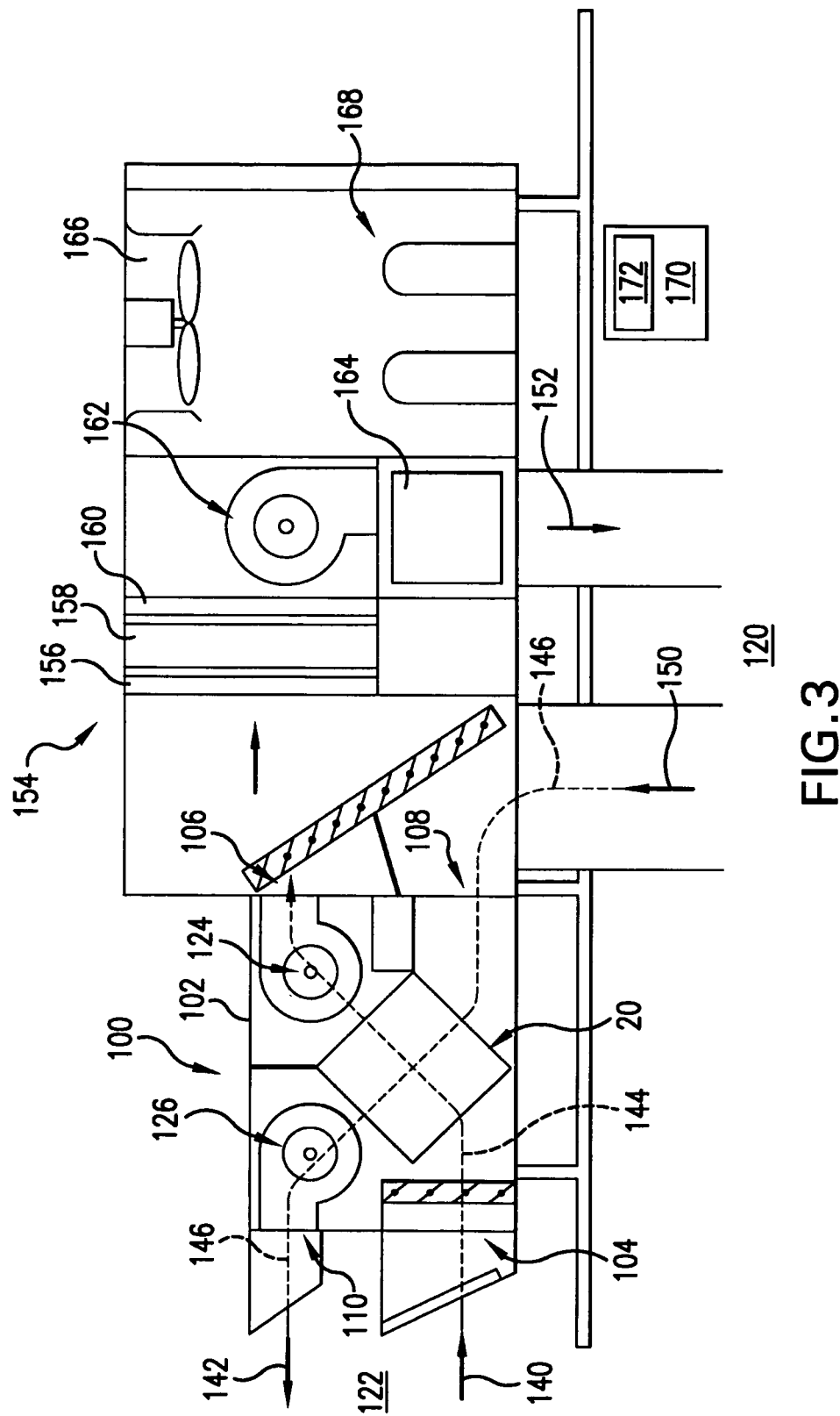
FIG. 3 is a schematic view of a system including the core of FIG. 1.

FIG. 3 shows an exemplary heat exchanger 100 including the core 20 in an operative position within a housing 102. The housing has an exemplary four main ports 104, 106, 108, and 110. With the core installed, the exemplary first and second flowpaths 90 and 92 are each aligned with an associated two of the ports to in communication with an interior space 120 to be conditioned and an exterior space 122. One or both of the flows may be driven by fans (e.g., blowers, air handlers, and the like). Other system components (e.g., dampers, filters, additional fans, and refrigeration/heating/dehumidification (e.g., economizer heat exchangers, heat rejection heat exchangers (gas coolers/condensers), heat absorption heat exchangers (evaporators)) components) may be present. The fans may be blow-through or pull-through. For example, FIG. 3 shows a pull-through first fan 124 driving the first flow from the exterior 122 to the interior 120 while a pull-through second fan 126 drives the second flow from the interior 120 to the exterior 122. In the FIG. 3 example, both flows are actively driven. However, one of the fans may be omitted so that the flow along its flowpath is passive, driven by the pressure difference produced from the fan along the other flowpath. An inlet air flow is labeled 140. An outlet/discharge airflow is labeled 142. The inlet flow 140 passes along a flowpath 144, while the outlet flow passes along the a flowpath 146. The flowpaths 90 and 92 may form segments of the flowpaths 144 and 146 through the housing and between the spaces 120 and 122. The inlet flow 140 passes along one of the flowpaths 90,92, while the outlet flow passes along the other of the flowpaths 90,92. The particular orientation (e.g., flow direction) and combination of the flowpaths 90 and 92 may be varied.

The exemplary system splits a return flow 150 into: a first portion that forms the flow 142; and a second portion that merges with the flow 140 to become a supply flow 152 entering the interior or conditioned space 120. The exemplary flow 152 passes through a conditioning section 154. The exemplary conditioning section includes: a filter 156; an evaporator 158 (e.g., a heat absorbing refrigerant-air heat exchanger); a moisture mixer 160; a fan 162, and a heating section 164. Other components (e.g., a compressor and expansion device) are not shown. An associated exterior fan 166 and condenser (e.g., a heat rejection refrigerant-air heat exchanger) 168 may be present. A control system (controller) 170 (e.g., a microprocessor-based microcontroller or microcomputer) may control system operation and may include or be coupled to a display 172 (e.g., an LCD display or a plurality of individual status lights). In one example of a mode changeover, the roles of the evaporator and condenser may be reversed.

The properties of the core 20 may be optimized for a particular seasonal condition (potentially including reference to associated exterior condition and/or conditions in the conditioned space) or range thereof. This may be insufficient to adequately address the entire range of anticipated conditions. For example, the core 20 may be optimized for a first seasonal range. An alternative core may be optimized for a second seasonal range. At a changeover between the two seasonal ranges, it may be desired to shift the core 20 (first core) out of the operative position and shift a second core into the operative position. Alternatively or additionally, the two cores may be optimized for other than calendar changes (e.g., day versus night operation).

Figure 5:
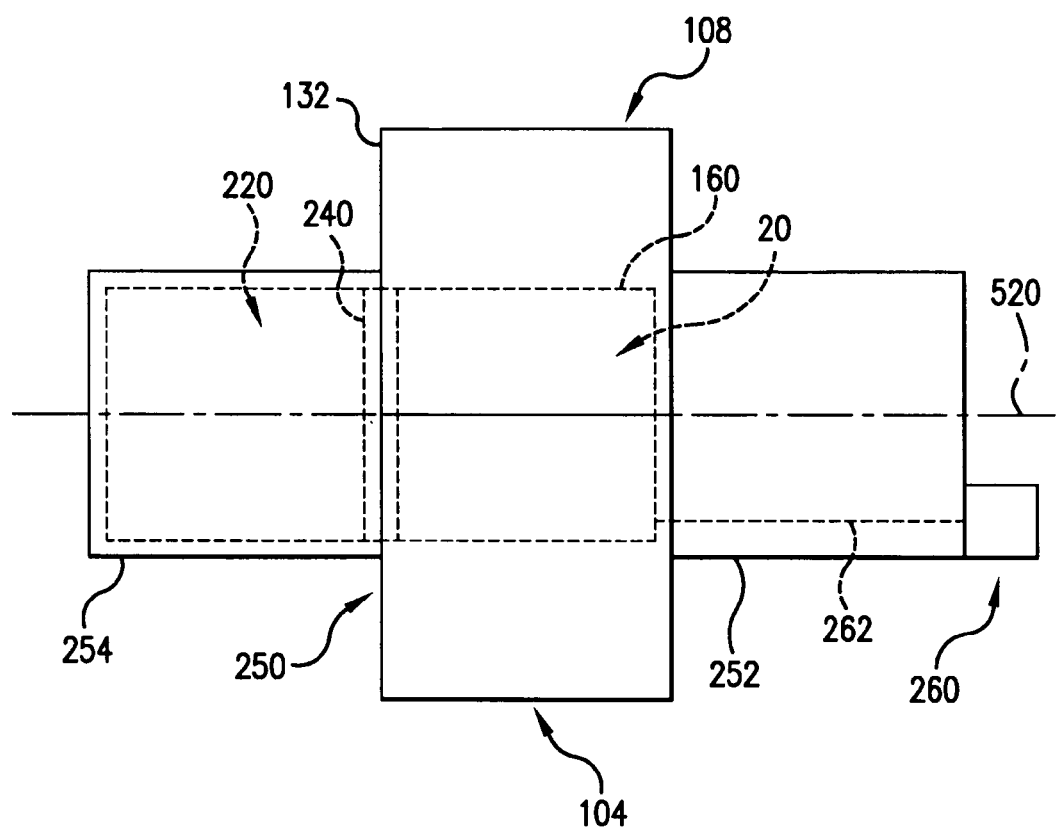
FIG. 5 is a top schematic view of the heat exchanger of FIG. 4 in a first condition.
Figure 6:
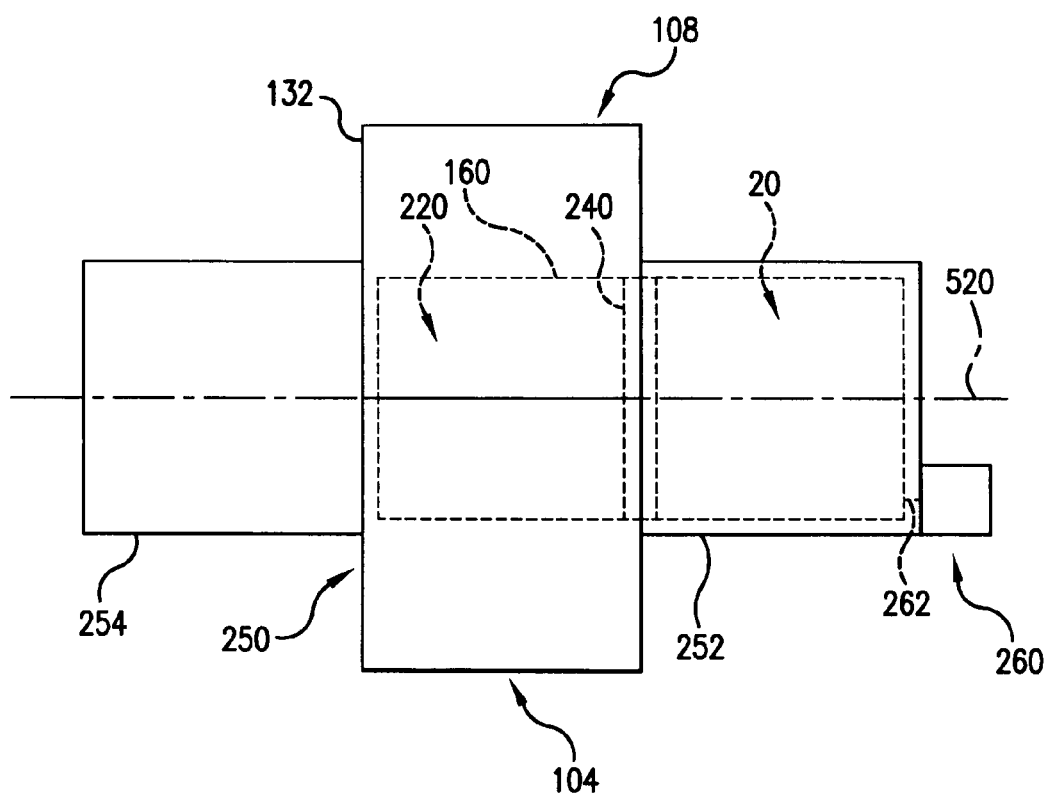
FIG. 6 is a top schematic view of the heat exchanger of FIG. 4 in a second condition.

FIG. 5 shows a first core 20 in the operative position. FIG. 5 further shows a second core 220 in an associated standby position aside the operative position. The first and second cores 20, 220 are coupled to a carrier 240 that is movable relative to adjacent system components for shifting the first and second cores between the operative and stand-by positions. For example, the housing 102 may include a main portion 250 (in which the operative position is located) and walls defining a first bay 252 and a second bay 254 on respective first and second sides of the operative position within the main portion 250. When the first core 20 is in the operative position, the second core 220 may be accommodated in the second bay 254. When the second core 220 is in the operative position (FIG. 6) the first core 20 may be accommodated in the first bay 252. An actuator 260 (e.g., having a drive screw 262) moves the first and second cores between the first condition of FIG. 5 and the second condition of FIG. 6 via the carrier 240. In the illustrated embodiment, the screw 262 engages the carrier 240, although other configurations are possible.

The second core 220 may differ from the first core in one or more aspects. As is discussed further below, one exemplary group of differences may involve providing the second core with moisture impermeable heat transfer member sections (e.g., an HRV core) in place of the membrane sections (e.g., of an ERV core). Alternative differences may involve membranes of different properties and/or different count.

Figure 7:
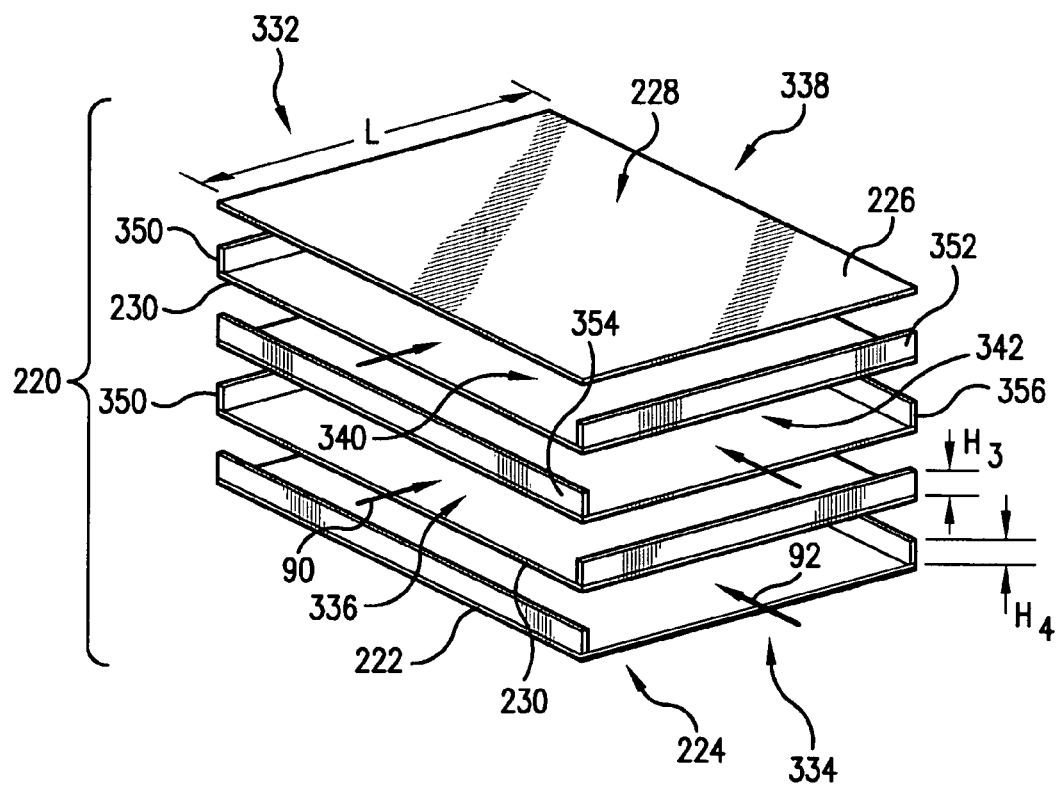
FIG. 7 is an exploded view of a second heat exchanger core.

Referring to FIG. 7, in one example, the second core 220 is a heat recovery ventilator (HRV core) which may be otherwise similar to the core 20 having an array of heat transfer member sections arrayed from a first section 222 at a first end 224 to a second end section 226 at a second end 228. Intermediate sections 230 are spaced between the sections 222 and 226. Exemplary sections 222, 226, and 230 are metallic sheets or plates. The core 220 has a first pair of opposed sides 332 and 334 and a second pair of opposed sides 336 and 338. Each exemplary heat transfer member section is spaced apart from its adjacent section or sections to define interspersed first and second passageways 340 and 342. The first passageways 340 have open ends respectively at the core sides 336 and 338 and closed ends (sides) respectively at the core sides 332 and 334. Conversely, the second passageways 342 have open ends along the sides 332 and 334 and closed ends (sides) along the sides 336 and 338.

The closed sides of the exemplary passageway may be defined by associated closure pairs. A first pair of first and second closure bars 350 and 352 are along each first passageway 340 whereas a second pair of first and second closure bars 354 and 356 are along the second passageways 342. The heights $H_3$ and $H_4$ may be similar to $H_1$ and $H_2$ or may differ (e.g., if there are a different number of membrane sections than heat transfer member sections). The length L and overall core height may be similar to that of the core 20.

Relative to the ERV and its membrane sections the HRV and its heat transfer member sections have relatively high sensible heat transfer effectiveness. In an exemplary winter mode, advantages of the HRV heat transfer member sections in sensible heat transfer may outweigh advantages of ERV membrane sections in latent heat transfer effectiveness and/or may provide advantageous humidity management benefits. With ERV cores likely having a relatively shorter life, the transfer of the second core 220 into the operative position may also have benefits in reducing consumption of ERV cores (extending replacement intervals and reducing costs). Thus, possible seasonal ranges of HRV use might be extended beyond the range wherein heat transfer and/or humidity management are advantageous.

A first example involves a building that is not very tight. The building has a moderate to high degree of air infiltration. The building is in a cold winter climate zone where the air is relatively dry. Use of a high latent effectiveness ERV core in the winter will help retain moisture in the air. Theoretically, in the summer, the same ERV core could be used because the high latent effectiveness ERV core reduces the moisture load (latent load) on the air conditioning system, thereby saving energy. However, if heating fuel prices are high, the energy saving benefit of using an HRV core in the winter may outweigh the moisture retention benefits of an ERV core. In such a situation, the system could shift from the HRV core in winter or winter-like conditions to the ERV core in summer or summer-like conditions.

A second example is a tight or so-called green building with low infiltration (e.g., a relatively modern building). In such a building, moisture build-up can be a problem. This is generally significant in residential buildings and in those commercial buildings having relatively high concentration of moisture sources. Possible implementations include using an HRV core during shoulder seasons (before and after the summer air conditioning season) to help purge the moisture. In such a situation, an ERV core may be used at other times. For example, the ERV core would be used in the summer air conditioning season or under similar conditions. Depending upon the relative significance of the energy efficiency issue on the one hand and the moisture management issue on the other hand, either the HRV core or the ERV core could be used during winter heating season or similar conditions.

Figure 4:
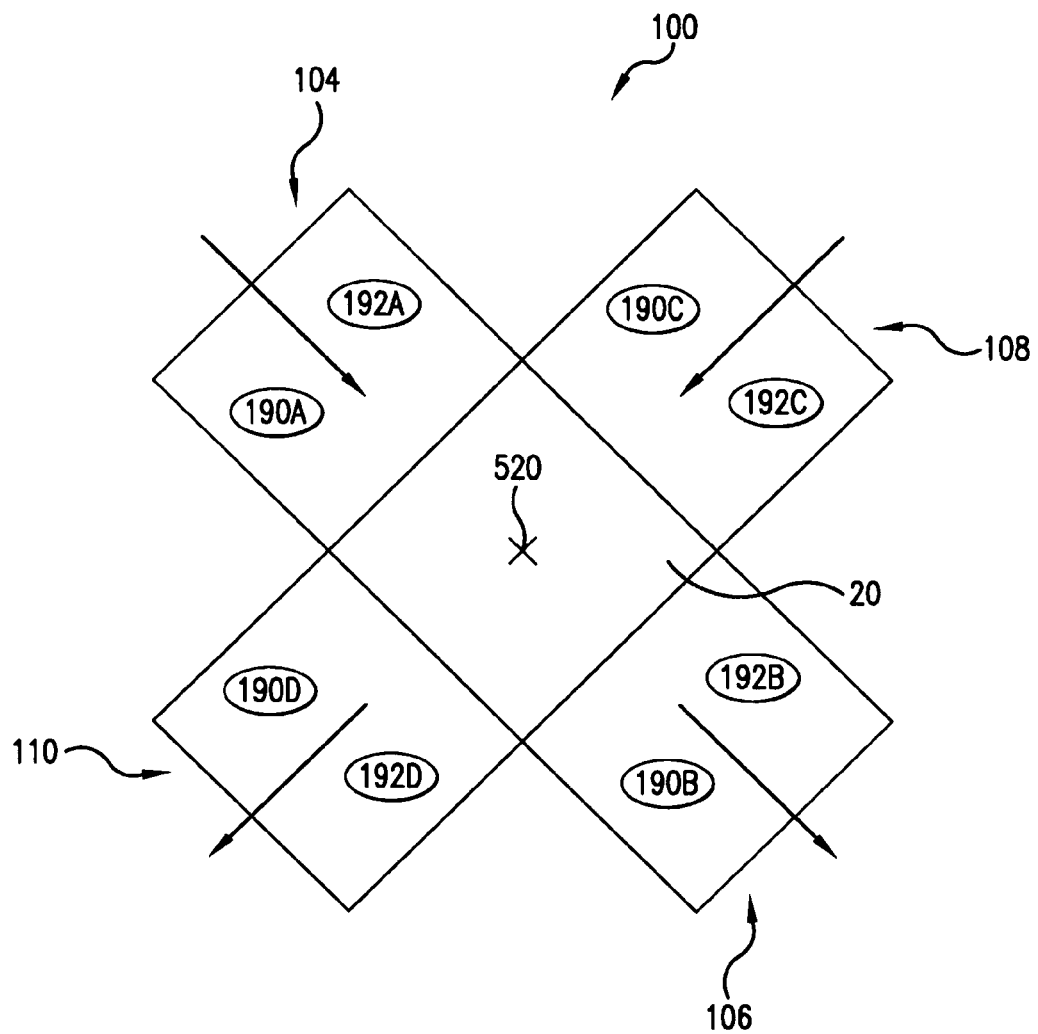
FIG. 4 is a side schematic view of a heat exchanger of the system of FIG. 3.

The actuator 260 is coupled to the control system 170. The control system 170 controlling the actuator to shift the cores between the first (FIG. 5) and second (FIG. 6) conditions responsive to seasonal changes (e.g., calendar based and/or sensed/calculated condition). Sensed conditions may include various system temperatures and/or humidities identified from associated sensors 190A-D and 192A-D respectively (FIG. 4). One alternative involves manually triggering rather than automatically triggering the core shift. For example, the control system may indicate a needed shift and a user may then input a command (e.g., via switch or touch screen) to command the shift. A more basic system involves the control system so indicating the needed shift and the user manually shifting the cores (e.g., sliding the core assembly in the absence of an actuator). The control system 170 may also be configured to, based upon input from the sensors, determine a degradation of the first core 20 and display an indication of a need for its removal/replacement with a like core.

Core changeover may be part of a more complex system control to optimize a desired combination of parameters. For example, whereas a basic system may have essentially constant default airflow parameters, active control of airflow parameters may alter the conditions under which changeover is optimal. For example, the current effectiveness of a core depends upon: the mass flux of the two streams; the inlet and outlet air temperatures of the two streams; and, in the case of an ERV, the relative humidities and condition of the membranes (degradation and cleanliness). The mass flux may be influenced by respective fan speeds and may be associated with respective pressure drops. The control system may be configured (e.g., via one or both of software and hardware) to calculate core effectiveness (e.g., instantaneous core effectiveness and recent effectiveness history). Based upon the effectiveness, the control system may vary the fan speeds to optimize effectiveness or a combination of effectiveness and energy efficiency. In general, the maximum effectiveness is achieved when flow is the same along the two paths. However, many building issues (e.g., active and/or passive venting from plumbing, appliances, and the like) may lead to insufficient outlet/exhaust flow to balance the inlet/supply flow. In such a situation, a portion of the supply flow might be diverted along a bypass flowpath to bypass the core and thereby balance the portion of supply flow passing through the core with the exhaust flow passing through the core. This may reflect a trade-off between energy recovery and the expense of fan energy to drive air through the core. If the fan speed adjustment would not optimize the desired effectiveness/energy combination as well as a core changeover, the control system may then effect core changeover (e.g., to gain more energy recovery for a given amount of fan energy expenditure).

In another aspect, the two surfaces (faces) of a given membrane section may experience different degrees or types of contamination or other degradation during operation of the heat exchanger. Also, the degree of degradation may vary from upstream to downstream. It may therefore be desired to rotate the core to provide a more uniform overall degradation and, thus, a longer effective service life before core replacement.

Figure 8:
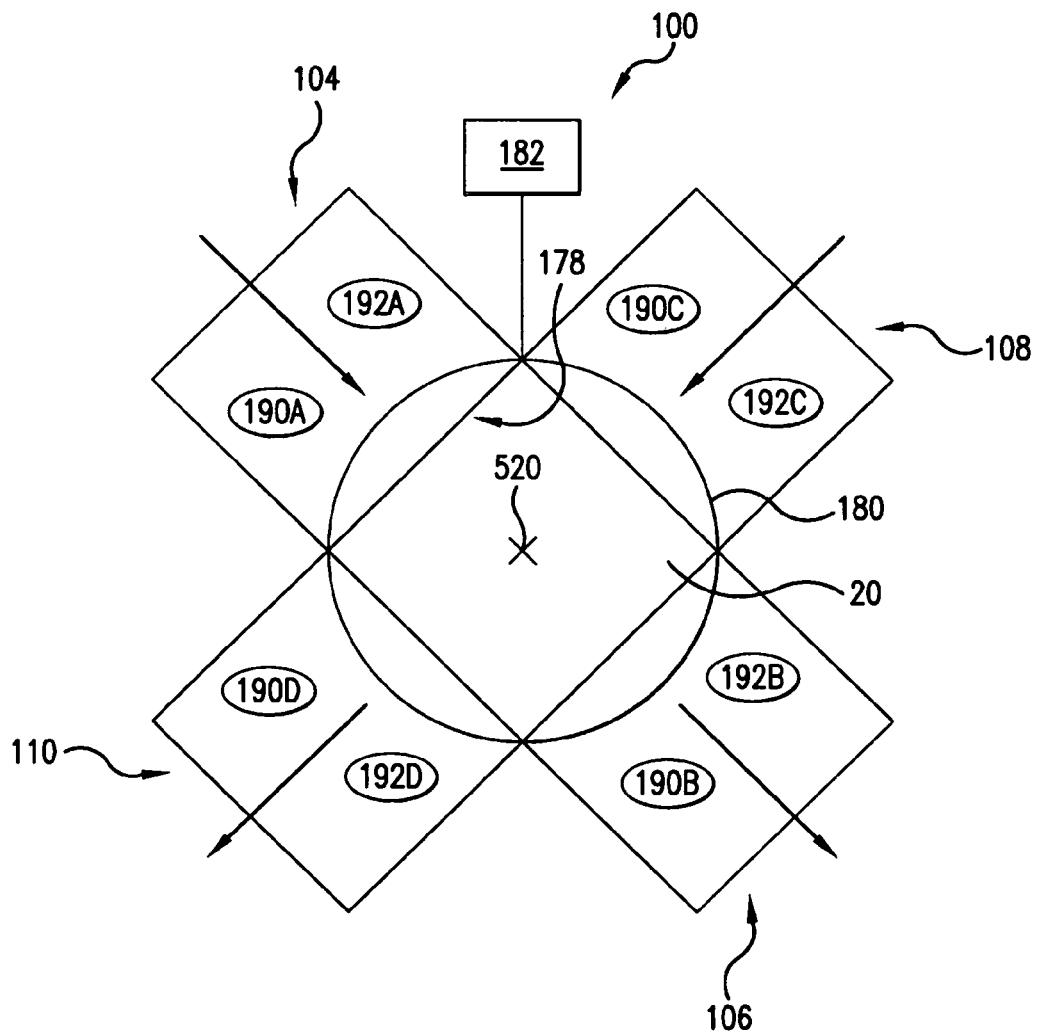
FIG. 8 is a side schematic view of an alternate heat exchanger of the system of FIG. 3.

FIG. 8 schematically shows a heat exchanger including the core 20 mounted in a compartment 178 of a carrier 180. An exemplary carrier is a carousel which is rotatable about an axis 520. Rotation may be via an actuator 182 (e.g., a motor such as a stepper motor) coupled to the carousel (e.g., via an actuator linkage or a motor belt, chain, or gear drive). The motor may be controlled by a controller which may be the control system 170. In a given system operating condition (e.g., heating mode or cooling mode) and from a given starting orientation of the core, a 180° core rotation reverses the flow directions along the respective flowpaths 90 and 92 of FIG. 1. A 90° core rotation switches the association of the flowpaths 90 and 92 (FIG. 1) relative to the flowpaths 144 and 146 (FIG. 3) with one set of flow directions; a 270° provides the opposite flow directions.

The rotations may be performed responsive to one or more of: sensed conditions indicating core condition; sensed conditions indicating operating environment, time, and the like. The rotation may be responsive to instantaneous values of such conditions or integrated values (integrated over time or flow). One exemplary time may be the length of time the core has been in its current orientation. Another may be the length of time the core has been in its current orientation with an airflow forced through it. More complicated factors may be combinations of time and airflow (e.g., a product representing an integrated airflow amount).

FIG. 8 shows an exemplary system using combined temperature and relative humidity sensors 190A-D respectively associated with the four ports of the heat exchanger to/from the carousel and flow (rate) sensors 192A-D respectively associated with the four ports. The control system 170 may calculate EERV effectiveness of the core based upon the flow rates, temperatures, and relative humidities. A threshold degradation in EERV effectiveness may cause the control system to cause or indicate (e.g., on the display 172) a rotation. For example, the control system may be programmed with a table or function identifying a nominal (alternatively the lower threshold) EERV effectiveness based upon system operating conditions (e.g., interior and exterior conditions). An exemplary threshold is 10-20% less (e.g., ~15%) than the nominal ERV effectiveness (e.g., nominal for a new/clean core).

For example, the information from the combined temperature and relative humidity sensors 190 A-D and flow sensors 192 A-D may be fed to the control system 170 to calculate the instantaneous ERV sensible effectiveness factor ($\epsilon_s$), latent effectiveness factor ($\epsilon_L$), and total enthalpy effectiveness factor ($\epsilon_t$). $\epsilon$ is actual transfer of moisture or energy divided by maximum possible transfer between airstreams and is disclosed in 2004 ASHRAE Handbook: HVAC Systems and Equipment, Chapter 44, Air-to-Air Energy Recovery, ASHRAE, Atlanta, Ga., 2004. A time period, for example between ten minutes and two hours is used to calculate the time average effectiveness, as well as the average operating conditions. The calculated effectiveness is compared to a stored and/or calculated nominal effectiveness of a new/clean core at the same operating conditions. If the calculated value is less than the nominal value by at least said threshold, the control system may cause and/or indicate the rotation.

An alternative trigger of the rotation can be simply be one based on the operation time and/or flowrate. After the ERV has been operating in a certain position for a period (e.g., three to nine months), the control system may cause and/or indicate the rotation. Because the flow of air may have varied over this period, it is more appropriate to compute the total amount of airflow that the core processed (e.g., via integration of instantaneous measured values or values inferred from settings). Because the amount of airflow will depend on the size of the membrane core, the control system may be programmed with a table that establishes the amount of total airflow at which a rotation may be either caused and/or indicated.

When the operating conditions are used to determine the time for a rotation, the control system may have incorporated a filter algorithm that prevents premature rotations due to positive or negative spikes in the temperature and/or relative humidity.

Figure 9:
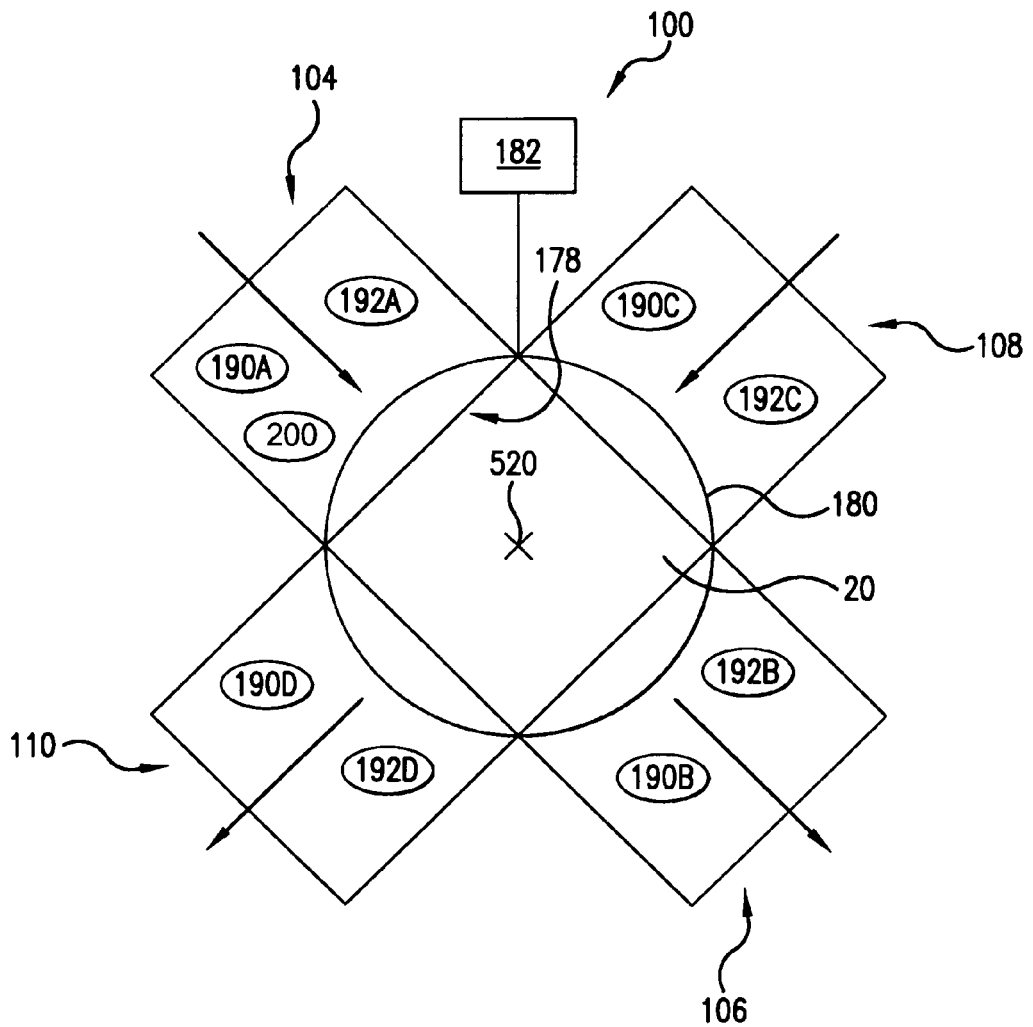
FIG. 9 is a side schematic view of a second alternate heat exchanger.

FIG. 9 shows the heat exchanger of FIG. 8 also including an ozone sensor 200 positioned to measure an ozone content of the airflow 140 prior to entering the core. The control system 170 may determine an integrated value of the ozone content to indicate a total exposure of the core to ozone. Responsive to the total exposure exceeding a threshold exposure, the control system may cause or indicate a rotation. Other chemical species may be measured in addition to or alternatively to ozone. These include: levels of halides, chlorides, and/or oxides of nitrogen; oxides of sulfur; and airborne oil.

Figure 10:
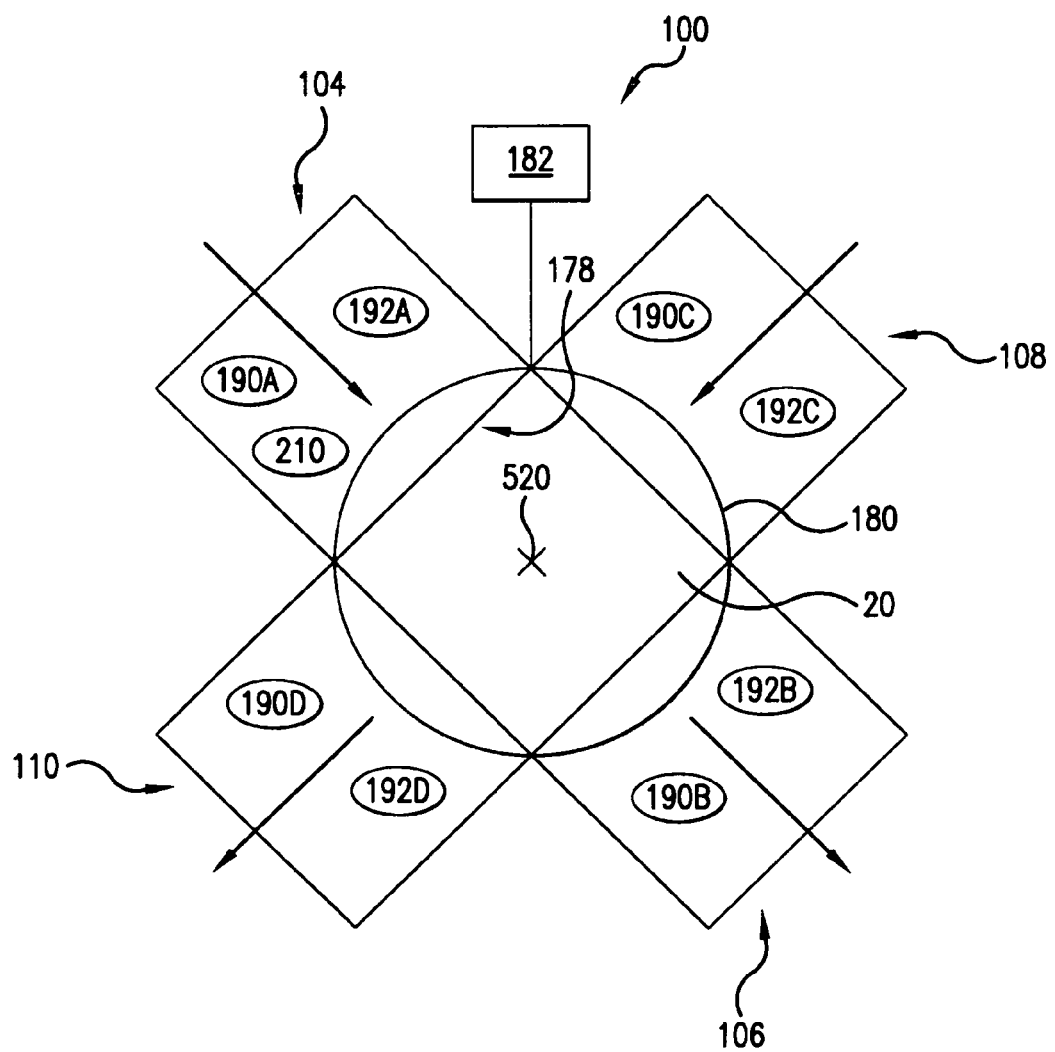
FIG. 10 is a side schematic view of a third alternate heat exchanger.

FIG. 10 shows heat exchanger of FIG. 8 including the addition of a spectrum sensor 210 positioned to measure a color spectrum of the core (e.g., of one of the membrane sections) along the flowpath 140. Responsive to color reaching a threshold change from nominal, the control system may cause or indicate a rotation.

As an alternative to a fully automatic rotation, there may be a manually commanded automated rotation. For example, the control system could cause a display (e.g., on a local control panel or a remote monitoring computer) to display an indication of a need for rotation and identify a particular rotation. A user may then via switch or other input, command said rotation. In yet other embodiments, the rotation may be manual (e.g., the user rotates the carousel or flips the core responsive to the need indicated by the control system).

In alternative implementations, one or more of the sensors (ozone, color, chemical, etc.) may be mounted to the carousel to rotate with the core.

Additionally, a flipping about an axis normal to the axis 520 may reverse the direction of only one of the flowpaths 90 and 92. Such a flipping might be manually performed or provided via a more complex multi-axis carousel or via flow redirecting baffles or valves.

The foregoing features may be integrated with features providing an indication of a need for core replacement. This may include memory in the control system that keeps track of rotations of the core.

Referring again to the FIG. 3 example, both flows are actively driven. However, one of the fans may be omitted so that the flow along its flowpath is passive, driven by the pressure difference produced from the fan along the other flowpath. In any of those three basic examples, the pressure along the first flowpath 90 will typically be greater than the adjacent pressure along the second flowpath 92. This pressure difference may cause local billowing (e.g., between spacer contact points) of the membrane sections 30 from the first passageways 40 into the second passageways 42. The billowing may produce an effective restriction of the second passageways 42. This may cause a less-than-optimal flow along the second flowpath.

The billowing deflection is exacerbated if the height of the closure bars exceeds the height of the associated spacers. The amount of deflection will depend on the amount of tension on the membrane sections. Hence, due to this billowing process the longitudinal pressure drop on the higher pressure side of each membrane section will be lower than the longitudinal pressure drop on the lower pressure side (other factors being equal). If the lower pressure side is the building exhaust side of the heat exchanger, this pressure-influenced constriction would directly reduce the exhaust air mass flow.

In general, the effectiveness of the heat exchanger is increased when the high and low pressure sides of each membrane section operate at equal mass flows. The mass flow depends on the driving longitudinal pressure difference and the associated pressure drop. The pressure difference may be developed by one or more fans that may be in a blow-through (upstream of the heat exchanger) or a draw-through (downstream of the heat exchanger) configuration. The pressure drop (resistance) depends on the velocity of the air, the height of the channel, and the shape of the spacer, among other things. The structural shape of the spacer and its orientation relative to the flow direction will govern the amount of stirring and pressure drop. In general, for a given spacer construction there will be a trade off between the pressure drop and the heat transfer efficiency as the spacer angle is rotated relative to the flow. The potential change in heat transfer is due to the stirring caused by the struts of the spacer and the effect on the boundary layers. The velocity through each layer may be adjusted (dynamically) with a variable speed fan based on the current mass balance given the amount of deflection. The cross-plate pressure drop and the longitudinal mass flows are thus governed by the fan arrangement. Independent fans may be present for the supply and return legs or there may be only a single supply fan that causes exhaust flow by pressurizing the ducts and room(s) that connect the supply and return sides. Further each side may be either blow through or draw through relative to any fans driving air through that side.

Any deflection of the membrane will change the pressure drop and associated fan power needed to drive the desired mass flows. The longitudinal pressure drop is a function of the design of the spacer and the height between layers. The nominal height is set by the spacer and/or the closure bars at the edges. The amount of deformation will be determined by the amount of tension on the membrane and the elasticity of the membrane. The spacer sometimes acts as a mechanical stop by creating touch points between it and the membrane. Sometimes the interlayer support is glued to the membrane. In a building the discharge of the exhaust side is near atmospheric pressure. The entrance of the exhaust side is generally near the pressure of the discharge of the supply side, if they are in communication with the building interior.

In a blow-through configuration on the supply side, such as is generally used in ARI 1060 testing, the entrance to the supply side (outside air) will generally be at the highest pressure in the system. An asymmetry may be provided in the core. For example, the interlayer gap used for the supply side may be lower than that used for the return side. This eases return flow. In an idealized situation of no leakage, the supply and return flows will always be the same and the asymmetry may slightly increase the amounts of both. However, as is discussed below, the asymmetry may also be relevant in non-idealized situations wherein the asymmetry is used to improve the balance between supply and return flows.

If an exhaust air fan is used, the situation will be slightly different depending on the exhaust fan strength and whether it is blow-through or draw-through. In this configuration any constriction of the return side would exacerbate the flow imbalance between supply and exhaust.

In a draw-through configuration on the supply side, the supply side may be restricted by the fan suction and the return side expanded. The amount will depend on the presence and location of an exhaust return fan. This configuration may be more appropriate than the ARI 1060 configuration in actual practice with these devices. Supply and exhaust fan speeds could be used to balance the mass flows to force operation at the effectiveness point desired.

The core 20 asymmetry may allow elimination of one of the fans, or, in the case of nonlinear pressure response with face velocity, permit lower overall average pressure drop operation. The advantage is that it helps control the longitudinal pressure drop differences when supply and exhaust legs of a heat exchanger are at different relative pressures in a building. Billowing of plates does not generally occur with stiff plate heat exchangers. For thin films it may be difficult to keep each film in enough tension relative to is elasticity to control deformation. This could, for example, eliminate the need to bond supporting material to the polymer membrane to help avoid deflection. Hence, for any fan configuration chosen, for each leg the height of the channel and orientation of the spacer could be chosen to maximize the performance under the operating pressures and amounts of deflection.

As noted above, in a closed system (e.g., where the interior 120 is otherwise sealed), the effect of the billowing restriction may be to slightly increase backpressure and decrease the flow rates along the two flowpaths (which would be identical).

Figure 11:
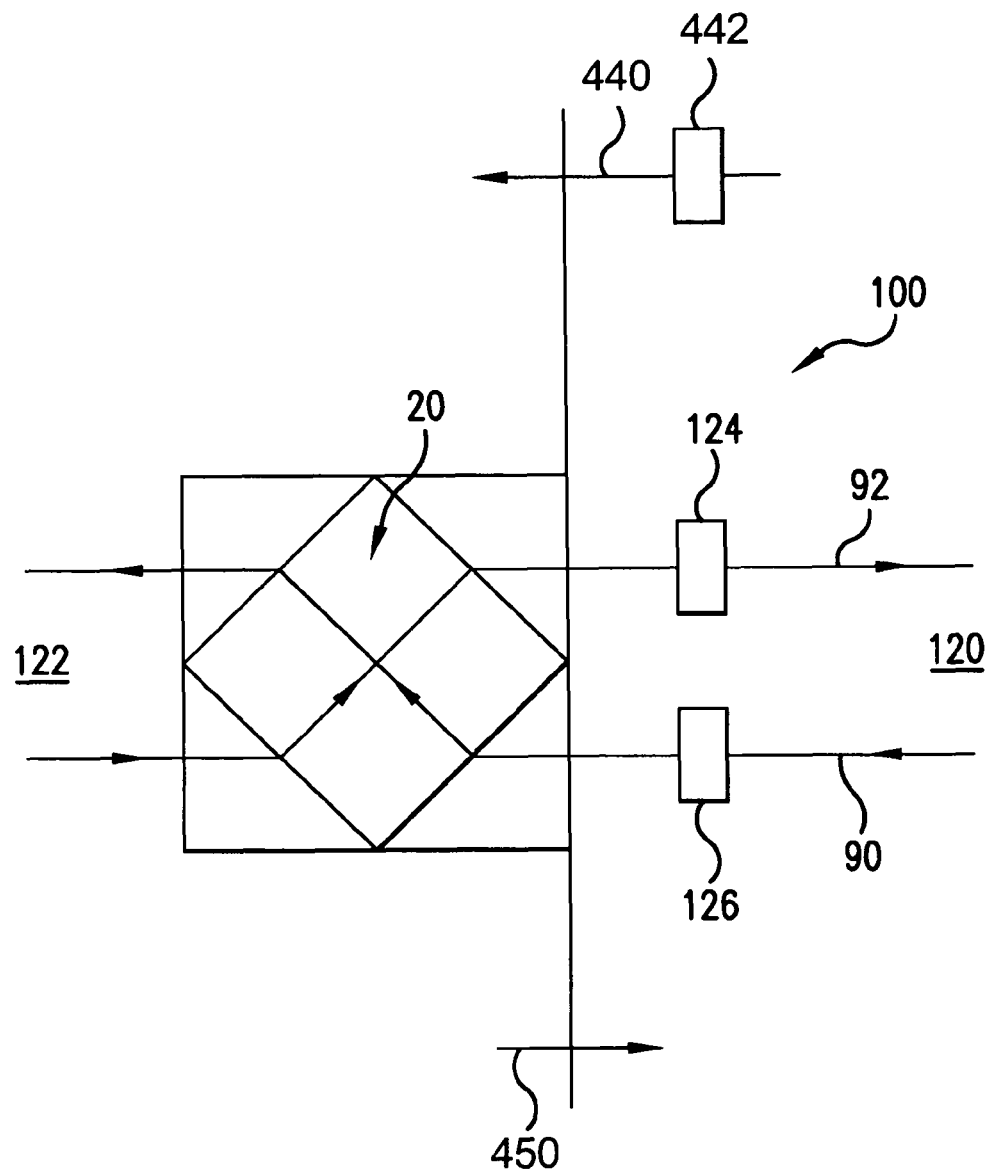
FIG. 11 is a schematic view of a second system including the core of FIG. 1.

In an open system (e.g., where air can leak from the interior space via other routes), however, the billowing restriction may decrease the flow along the second flowpath 92 with lesser or no decrease along the first flowpath 90. In various circumstances, such an imbalance may be undesirable. FIG. 11 shows a more open system. Forced diversions may lower the pressure in the interior space 120 relative to the exterior space 122. For example, FIG. 11 shows a secondary exhaust flowpath 440 along which a forced airflow is driven by a fan 442. Examples of the flowpaths 440 are bathroom and kitchen ventilation. In an otherwise sealed environment, the mass flow along the flowpath 440 would be exactly offset by a deficit in flow along the first flowpath 90 relative to the second flowpath 92. A portion of this difference may be provided by an infiltration flow (e.g., shown along a flowpath 450 representing the sum of infiltration leakage). However, many buildings will be maintained under positive pressure which may prevent this flow or create a net exfiltration (reversing the direction of 450). In the exemplary system, the fan 124 is positioned as a pull-through fan while the second fan 126 is positioned as a blow/push-through fan.

Accordingly, the foregoing situations may be addressed by creating an asymmetry between the two groups of passageways 40 and 42 defined by the core 20. One specific example would be to increase $H_2$ relative to $H_1$. For example, in a reengineering from a baseline configuration where the two are equal, $H_2$ may be increased while $H_1$ is correspondingly decreased. In a basic implementation of such a reengineering, the closure bars and spacers would each have the associated height $H_1$ and $H_2$ different from each other. Alternative reengineering examples may involve providing asymmetry of just the closures or of just the spacers. For example, the closures along both groups of passageways could have the same height whereas the spacers in the second passageways could be taller than those in the first. Such spacers in the first passageways could also be eliminated, with the protrusion of the spacers from the second passageways supplementing tension of the membrane sections. Exemplary asymmetries are both static (i.e., without air flows through the passageways) and dynamic (i.e., with airflows through the passageways). Alternative asymmetries might be only static or only dynamic.

Figure 13:
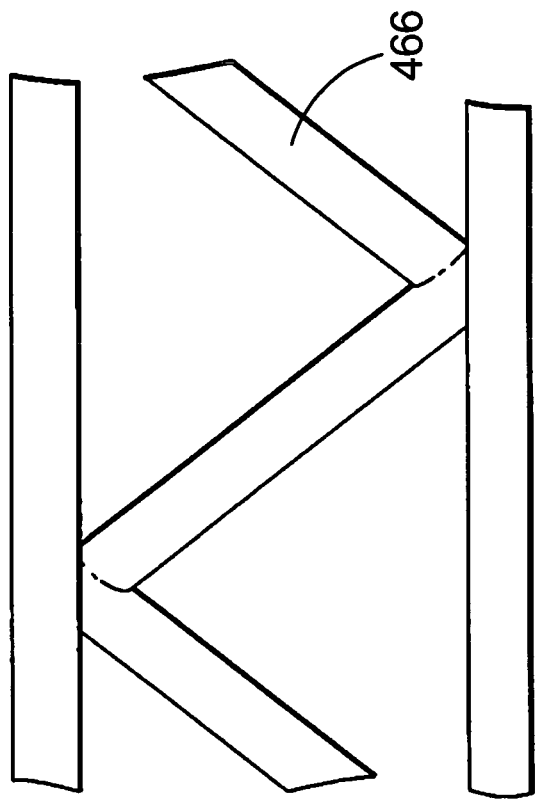
FIG. 13 is a view of the spacer of FIG. 12 in a low restriction orientation.
Figure 12:
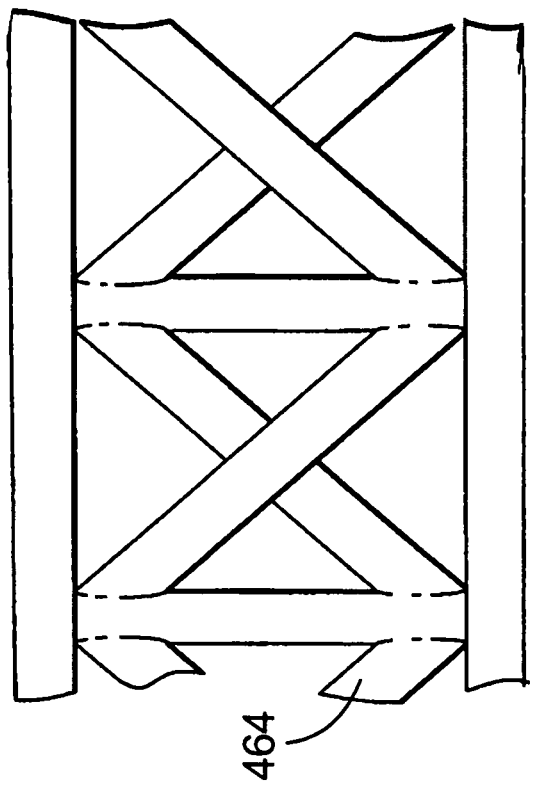
FIG. 12 is a view of a spacer in a high restriction orientation.

As noted above, other asymmetries involve having different relative spacer orientation or different spacer configuration to increase flow resistance and pressure drop along one of the flowpaths. FIGS. 12 and 13 respectively show a spacer in two different orientations: a FIG. 5 orientation of a spacer 464 providing relatively high flow resistance, stirring/mixing, and pressure drop; and a FIG. 6 orientation of a spacer 466 providing relatively low flow resistance, stirring/mixing, and pressure drop. For example, the spacers along the flowpath 92 could be selected to provide increased pressure drop along the flowpath 92 of FIG. 4 (the supply flowpath) relative to a baseline spacer (e.g., the spacers as used along the flowpath 90). This increased flow resistance has the effect of bringing the mass flow rates along the flowpaths 90 and 92 more into balance. For example, with all other factors (fan size, fan speed, and the like) being held constant, the supply flow rate would be reduced relative to a symmetric core with low pressure drop spacer configurations and/or orientations along both flowpaths.

One or more embodiments have been described. Nevertheless, it will be understood that various modifications may be made. For example, when implemented in a retrofit of a given HVAC system or reengineering of an existing configuration of such a system, details of the baseline configuration may influence any particular implementation. Accordingly, other embodiments are within the scope of the following claims.

What is claimed is:

1. A heat exchanger comprising:
   a housing having:
      a first flowpath from a first inlet to a first outlet; and
      a second flowpath from a second inlet to a second outlet;
   a first core comprising:
      a membrane; and
      first and second passageways on first and second sides of the membrane;
   a second core comprising:
      a heat transfer member less permeable than the membrane; and
      first and second passageways on first and second sides of the heat transfer member; and
   an actuator, coupled to the first and second cores to shift the physical location of the first and second cores between:
      a first condition wherein the first core first passageway is along the first flowpath and the first core second passageway is along the second flowpath and the second core is not along the first and second flowpaths; and
      a second condition wherein the second core first passageway is along the first flowpath and the second core second passageway is along the second flowpath and the first core is not along the first and second flowpaths.

2. The heat exchanger of claim 1 further comprising:
at least one sensor positioned to detect at least one environmental condition; and
a controller coupled to the sensor and the actuator to shift the first and second cores between the first and second conditions responsive to input from the sensor.

3. The heat exchanger of claim 2 wherein:
said at least one sensor measures a humidity.

4. The heat exchanger of claim 2 further comprises:
an indicator, responsive to input from the at least one sensor, for identifying a needed replacement of the core.

5. The heat exchanger of claim 1 wherein:
the first and second cores are carried by a carrier; and
the actuator is coupled to the first and second cores via the carrier.

6. The heat exchanger of claim 1 wherein:
the second core heat transfer member is metallic.

7. The heat exchanger of claim 1 wherein:
the first core first passageways includes a plurality of first passageways;
the first core second passageways includes a plurality of second passageways interspersed with the first core first passageways; and
the membrane includes a plurality of membrane segments respectively separating adjacent pairs of the first core first and second passageways.

8. The heat exchanger of claim 1 further comprising:
an asymmetry between the first and second passageways, wherein the asymmetry comprises spacers of a first characteristic flow restriction within the first passageways and spacers of a second characteristic flow restriction, less than the first characteristic flow restriction, along the second passageways.

\* \* \* \* \*